United States Patent
Coulter et al.

(10) Patent No.: US 9,663,018 B2
(45) Date of Patent: May 30, 2017

(54) INTEGRATED FUEL DELIVERY APPARATUS

(71) Applicant: Halliburton Energy Services, Inc., Houston, TX (US)

(72) Inventors: Jonathan B. Coulter, Oklahoma City, OK (US); Billy D. Coskrey, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/906,855

(22) PCT Filed: Aug. 23, 2013

(86) PCT No.: PCT/US2013/056327
§ 371 (c)(1),
(2) Date: Jan. 21, 2016

(87) PCT Pub. No.: WO2015/026363
PCT Pub. Date: Feb. 26, 2015

(65) Prior Publication Data
US 2016/0167561 A1 Jun. 16, 2016

(51) Int. Cl.
*B62D 21/00* (2006.01)
*B60P 3/22* (2006.01)
(Continued)

(52) U.S. Cl.
CPC ............ *B60P 3/2265* (2013.01); *B60P 3/00* (2013.01); *B60S 5/02* (2013.01)

(58) Field of Classification Search
CPC ......... B08B 17/00; B08B 17/025; B60S 3/04; E03F 1/00; E03F 7/02; B65D 90/24; F16N 31/006
(Continued)

(56) References Cited

U.S. PATENT DOCUMENTS 3,959,845 A 6/1976 Cradeur et al.
4,454,999 A * 6/1984 Woodruff ............... B65H 49/34
242/388.7
(Continued)

FOREIGN PATENT DOCUMENTS

JP 2000-071856 A 3/2000
WO 2008-034226 A1 3/2008

OTHER PUBLICATIONS

International Search Report and Written Opinion issued in related PCT Application No. PCT/US2013/056327 mailed May 14, 2014, 9 pages.
(Continued)

*Primary Examiner* — Toan To
(74) *Attorney, Agent, or Firm* — John W. Wustenberg; Baker Botts L.L.P.

(57) ABSTRACT

Methods and systems for delivering fluids such as fluid fuel to equipment are disclosed. A fluid delivery apparatus may be detachably couplable to a towing vehicle. It may include a fluid inlet for detachable coupling to a fluid source, a conduit, and a trailer frame that doubles as a ramp permitting traffic to pass over the conduit, as well as a reel and hose for detachable coupling to a piece of equipment. The conduit may be in fluid communication with the fluid inlet such that the fluid may flow from the source, to the inlet, through the conduit, into the hose, and to the piece of equipment. Methods of using a fluid delivery apparatus may include delivering a fluid fuel to a piece of equipment at a first location, towing the apparatus to a second location, and delivering fluid fuel to a second piece of equipment at the second location.

18 Claims, 4 Drawing Sheets

(51) Int. Cl.
 *B60S 5/02* (2006.01)
 *B60P 3/00* (2006.01)

(58) Field of Classification Search
 USPC .............................. 280/782; 242/379, 390.5
 See application file for complete search history.

(56) References Cited

U.S. PATENT DOCUMENTS

| | | | | |
|---|---|---|---|---|
| 4,773,628 | A | * | 9/1988 | Aleshire ................ H02G 1/086 |
| | | | | 254/134.4 |
| 4,822,005 | A | * | 4/1989 | Aleshire ................ H02G 1/086 |
| | | | | 254/134.4 |
| 5,560,782 | A | | 10/1996 | Latimer |
| 5,865,392 | A | * | 2/1999 | Blount ............... B65H 75/4402 |
| | | | | 166/77.2 |
| 6,481,448 | B2 | * | 11/2002 | Mathieu .................. B08B 3/026 |
| | | | | 134/109 |
| D678,647 | S | | 3/2013 | Parras |
| 2002/0000332 | A1 | * | 1/2002 | Merecka ................... E21B 7/04 |
| | | | | 175/73 |
| 2005/0062030 | A1 | * | 3/2005 | Wentworth ............ B66D 1/741 |
| | | | | 254/323 |
| 2006/0157094 | A1 | | 7/2006 | Zeile |
| 2014/0209281 | A1 | * | 7/2014 | Kamps ..................... F28D 7/00 |
| | | | | 165/104.14 |
| 2016/0108606 | A1 | * | 4/2016 | Strutynsky ............ E02F 3/9231 |
| | | | | 37/348 |
| 2016/0198695 | A1 | * | 7/2016 | Cink ................... A01M 17/002 |
| | | | | 111/7.1 |

OTHER PUBLICATIONS

International Preliminary Report on Patentability issued in related PCT application No. PCT/US2013/056327, mailed Mar. 3, 2016. 6 pages.

* cited by examiner

INTEGRATED FUEL DELIVERY APPARATUS

CROSS-REFERENCE TO RELATED APPLICATION

The present application is a U.S. National Stage Application of International Application No. PCT/US2013/056327 filed Aug. 23, 2013, which is incorporated herein by reference in its entirety for all purposes.

BACKGROUND

The present disclosure relates generally to subterranean drilling and completion operations and, more particularly, to a method and apparatus for delivering fluids such as fluid fuel to equipment.

Oilfield operations are conducted in a variety of different locations and involve a number of equipments, depending on the operations at hand. Examples of the various equipment used include fracturing units, cementing units, blending units, material conveying units, trucks, and tractors. In some cases, this equipment may be powered by a fluid fuel such as natural gas, or it may include dual-fuel vehicles. A dual-fuel vehicle is an alternative fuel vehicle with an internal combustion engine designed to run on more than one type of fuel, for example diesel blended with natural gas.

Conventional natural gas delivery systems consist of multiple separate components, all of which must be transported from one piece of equipment to another within a site, or from one drill site to another. Such transportation typically may involve the use of a flatbed trailer holding all of the components individually. Each of the components must be unloaded, usually with a crane or other like heavy lifting equipment, and then connected so that natural gas may be conveyed across the components. This adds significant time and expense to set-up of natural gas delivery systems, and the multiple connections increase the likelihood of natural gas leakage.

FIGURES

Some specific exemplary embodiments of the disclosure may be understood by referring, in part, to the following description and the accompanying drawings.

Figure 2:
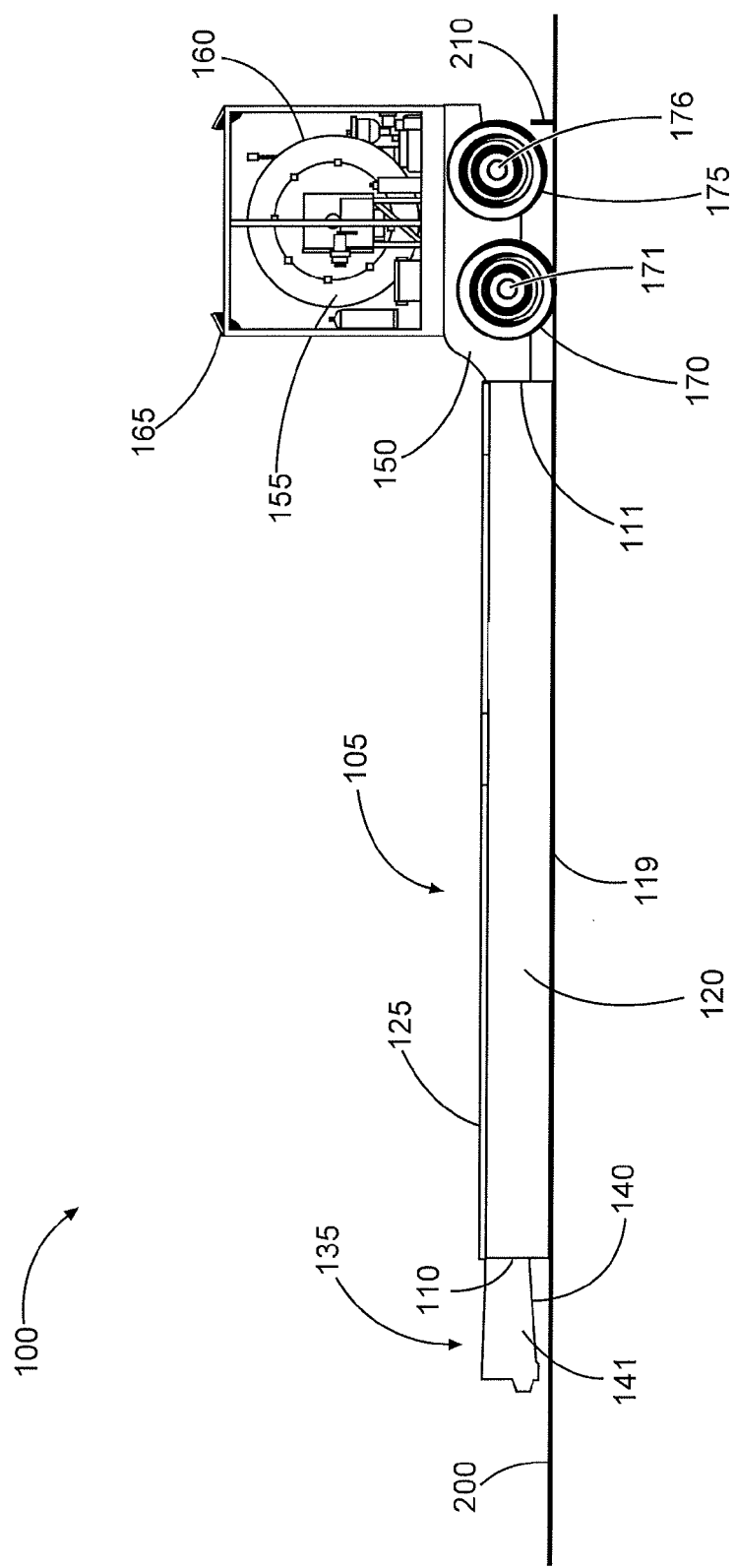

FIG. 2 depicts a trailer in accordance with another illustrative embodiment of the present disclosure While embodiments of this disclosure have been depicted and described and are defined by reference to exemplary embodiments, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

Illustrative embodiments of the present invention are described in detail herein. In the interest of clarity, not all features of an actual implementation may be described in this specification. It will of course be appreciated that in the development of any such actual embodiment, numerous implementation specific decisions may be made to achieve the specific implementation goals, which may vary from one implementation to another. Moreover, it will be appreciated that such a development effort might be complex and time consuming, but would nevertheless be a routine undertaking for those of ordinary skill in the art having the benefit of the present disclosure.

To facilitate a better understanding of the present invention, the following examples of certain embodiments are given. In no way should the following examples be read to limit, or define, the scope of the invention. Embodiments of the present disclosure may be applicable to delivering any type of fuel, including, but not limited to, natural gas, to any type of equipment.

The terms "couple" or "couples," as used herein are intended to mean either an indirect or direct connection. Thus, if a first device couples to a second device, that connection may be through a direct connection, or through an indirect connection via other devices and connections. Similarly, if a first device is "fluidically coupled" to a second device, fluid may flow between the first device and the second device through a direct or an indirect fluid flow path.

It will be understood that the terms "drilling equipment," "oil well drilling equipment," "drilling system" and "oil well drilling system" are not intended to limit the use of the equipment and processes described with those terms to drilling an oil well. The terms also encompass drilling natural gas wells or hydrocarbon wells in general. Further, such wells can be used for production, monitoring, or injection in relation to the recovery of hydrocarbons or other materials from the subsurface.

The present disclosure relates generally to subterranean drilling and completion operations and, more particularly, the present disclosure relates to a method and apparatus for delivering fluids such as fluid fuel.

In one embodiment, the present disclosure is directed to an apparatus for delivering fluid fuel such as natural gas. One possible benefit of this apparatus is that it may allow for significant ease of transport and set-up of a fuel delivery system such as, for example, a natural gas conveyance system. For example, the apparatus may provide for set-up without the need to lift any components with a crane. Other potential advantages of this apparatus include component integration, which may translate to faster set-up time and fewer gas connections than are present in traditional fuel conveyance systems, which thereby reduces the possibility of, e.g., fluid fuel leakage. The simplified set-up may further provide for enhanced safety of operations.

In some embodiments, the apparatus may be a trailer suitable for towing by a vehicle, such as a towing vehicle. Any suitable towing vehicle may be used without departing from the scope of the present disclosure. For example, in certain illustrative embodiments, the towing vehicle used may be a truck, a tractor, an automobile, and/or other ground transportation vehicles capable of pushing, pulling, or otherwise causing the trailer to move when the trailer is coupled to the towing vehicle. In certain implementations, the trailer may be capable of being and/or actually be detachably coupled to the towing vehicle. A number of suitable mechanisms may be used to detachably couple the trailer to the towing vehicle. For example, in certain illustrative embodiments, the detachable coupling may include hitching or hooking the trailer to the towing vehicle such that the trailer may be unhitched or unhooked. However, the present disclosure is not limited to any specific means for detachable coupling. Accordingly, any suitable means for detachable coupling known to those of ordinary skill in the art, having the benefit of the present disclosure, may be used to couple the trailer to the towing vehicle without departing from the scope of the present disclosure. In certain implementations, the detachable coupling means may be detachably coupled to a king pin of a towing vehicle for transport of the trailer. In some embodiments, the detachable coupling means may further couple the trailer to a wheel (e.g., a wheel extending under the hitch to a ground surface) in addition to being detachably coupled with a towing vehicle.

The trailers of certain embodiments may be capable of being laid flat or substantially flat on a ground surface when detached from the towing vehicle. A ground surface may include any surface on which or to which the trailer may be transported, such as paved or unpaved terrain, graveled or rocky terrain, grassy terrain, or the like. The trailer may also include a fluid conduit or other means for conveying a fluid along the trailer to a hose reel and hose at one end of the trailer, the hose being in fluid communication with the conduit. In some embodiments, the hose may further be capable of connection with a device to which a fluid needs to be supplied. For example, the hose may be detachably coupled with a piece of drilling equipment to which a fluid such as natural gas needs to be supplied. The trailer, when laid flat, may provide a structure protecting the fluid conduit. Further, the trailer may provide a surface over which ground traffic can drive without damaging or otherwise affecting the fluid conduit. In some embodiments, the trailer may provide a means of ready rig-up for natural gas or other fluid fuel supply, e.g., at a drilling site, whereby the trailer may be unhitched from a towing vehicle, laid substantially flat on a ground surface, and connected on one end to a fluid source, and on another end to a piece of equipment to which the fluid is to be supplied. Examples of pieces of equipment may include drilling equipment (e.g., hydraulic fracturing units), cementing units, material conveying units, trucks, and tractors. Some pieces of equipment may be dual-fuel equipment for which delivery of a fluid fuel such as natural gas may be necessary.

Figure 1A:
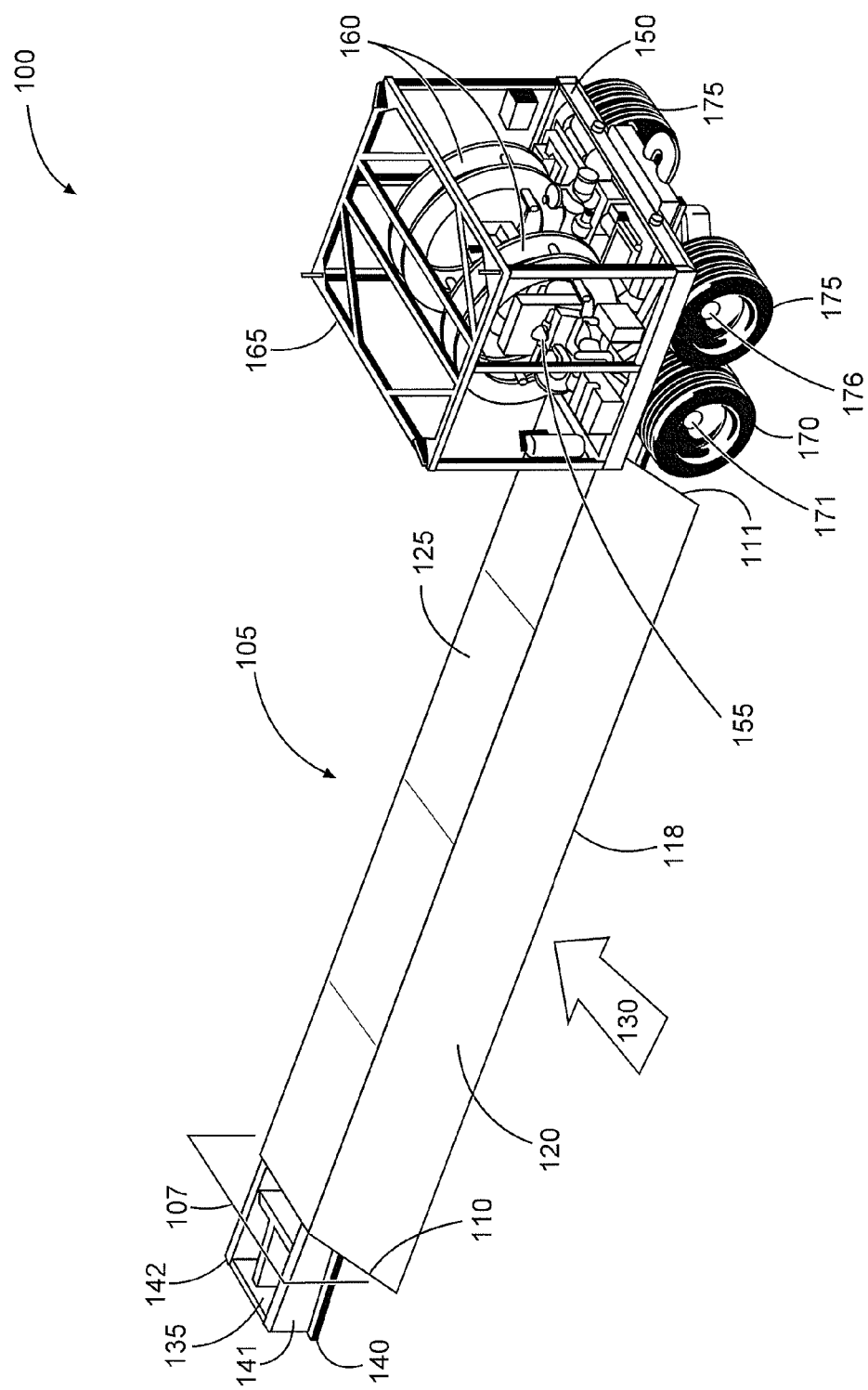
FIGS. 1A and 1B depict a trailer in accordance with an illustrative embodiment of the present disclosure.
Figure 1B:
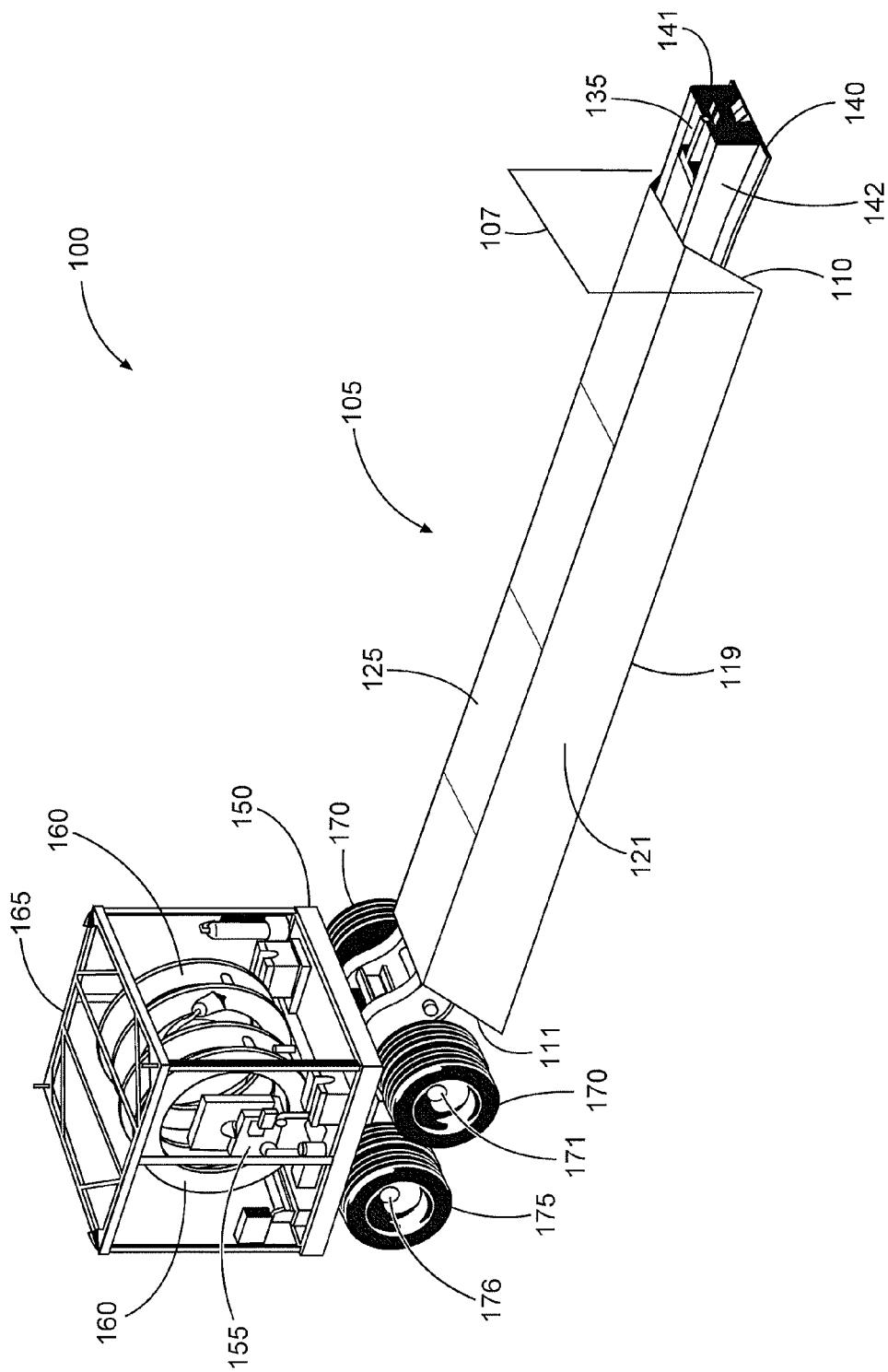

FIGS. 1A and 1B are diagrams of an example trailer 100 according to some embodiments of the present disclosure. Each figure shows a perspective overhead view from opposite sides of the trailer 100. The trailer 100 may include a trailer frame 105 having a proximal end 110 and a distal end 111. In some embodiments, the trailer frame 105 may be constructed from low carbon steel and/or high strength low alloy steel, and/or any other material suitable for construction of a trailer frame capable of serving as a bridging surface. The trailer frame 105 may include a top surface 107. In some embodiments, the top surface 107 is shaped in a manner so as to form a bridging surface. A bridging surface may, in some embodiments, include a combination of generally upwardly and downwardly sloped surfaces, such as an up-ramp and a down-ramp, over which wheeled traffic (e.g., a truck, tractor, automobile, or any other ground transportation apparatus capable of driving or otherwise passing over an up-ramp and down-ramp) may pass to go over the trailer frame 105 when the trailer frame 105 is placed on a ground surface. In certain illustrative embodiments, the top surface 107 of the trailer frame 105 may include two lower edges 118 (shown in FIG. 1A) and 119 (shown in FIG. 1B) such that, when the lower edges are substantially in contact with a ground surface, a middle portion of the top surface 107 between the two lower edges remains elevated off the ground surface.

Figure 1C:
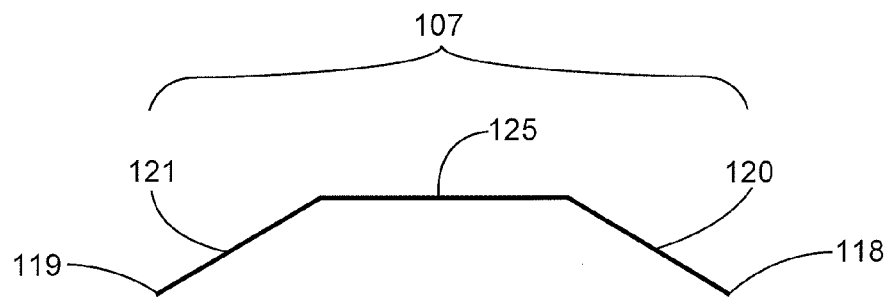
FIGS. 1C-1E depict a cross-sectional view of a portion of a trailer frame in accordance with different illustrative embodiments of the present disclosure.
Figure 1D:
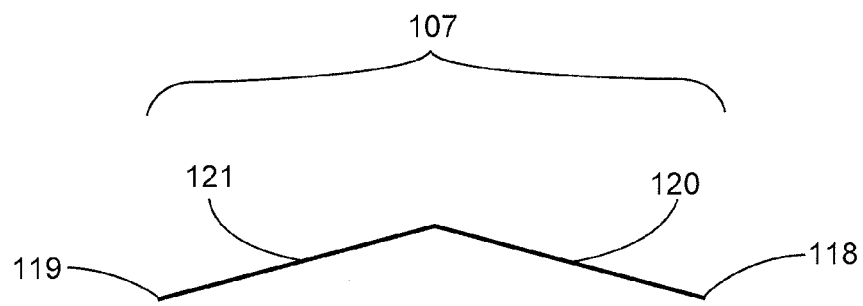
Figure 1E:
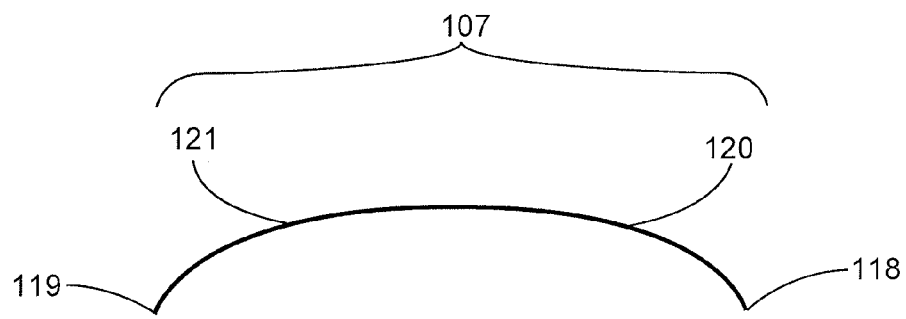

In certain of these embodiments, for instance as illustrated in FIGS. 1A and 1B, the top surface 107 of the trailer frame 105 may include a pair of sloped top surfaces 120 (shown in FIG. 1A) and 121 (shown in FIG. 1B). The top surface 107 may in some embodiments also include a flat portion 125 such that from a head-on view of the trailer frame 105 (e.g., on a line from the proximal end 110 to the distal end 111 of the trailer frame 105), the top surface 107 may have a generally trapezoidal shape as shown in FIG. 1C. It will be understood that the top surface 107 may take on any shape suitable for permitting wheeled traffic to pass over the surface while maintaining a gap between the middle portion of the top surface 107 (that is, the portion between the top surface's lower edges 118 and 119) and the ground surface. For example, in some embodiments, the top surface 107 of the trailer frame 105 may not include a flat surface 125, while still including a pair of sloped top surfaces 120 and 121. For instance, in one illustrative embodiment the top surface may have a substantially triangular shape when viewed head-on in a line from the proximal end 110 to the distal end 111 of the trailer frame as shown in FIG. 1D. In other embodiments, the top surface may have a substantially semicircular shape (e.g., it may be a semicircle curved in a convex manner with respect to the ground surface) when viewed head-on in a line from the proximal end 110 to the distal end 111 of the trailer frame as shown in FIG. 1E.

In addition, the sloped top surfaces 120 and 121 of some embodiments may be foldably and/or detachably coupled to a flat top surface 125. Alternatively, in embodiments where no flat top surface 125 is present, the sloped top surfaces 120 and 121 may be foldably and/or detachably coupled to each other. Specifically, the top surface 107 may comprise two quarter-circular sloped top surfaces 120 and 121 foldably and/or detachably coupled to each other such that the top surface 107 has a substantially semicircular shape (as shown in FIG. 1E) when viewed head-on in a line from the proximal end 110 to the distal end 111 of the trailer frame). Returning to an example top surface 107 including a flat surface 125 and sloped top surfaces 120 and 121, where sloped top surfaces 120 and 121 are foldably coupled to the flat surface 125, they may be coupled (e.g., via hinges or like mechanisms) in a manner such that they are capable of being folded over and onto the flat surface 125 and/or each onto the other when in a folded position (e.g., sloped top surface 120 may be folded onto flat surface 125, followed by sloped top surface 121 being folded onto sloped top surface 120, in the folded position). Thus, although described herein as a "sloped top surface," each of the sloped top surfaces 120 and 121 of some embodiments may, when viewed in isolation, be substantially flat, but form a slope when unfolded (and/or when viewed relative to a ground surface and/or a flat surface 125, as can be seen in FIGS. 1A-E). This may be useful, inter alia, in embodiments wherein the width of the trailer frame exceeds legal width for ground vehicles on an Interstate, highway, or other such road. Likewise, in embodiments wherein sloped top surfaces 120 and 121 are detachably coupled to the flat surface 125, they may be capable of being removed from the flat surface 125. This could similarly be useful, for example, in reducing the width of the trailer frame during transport.

The trailer frame 105 may further include a fluid inlet 135 disposed at the proximal end 110. The fluid inlet may comprise one or more connectors, valves, couplings, or other conventional devices (not shown) that are detachably couplable to a fluid supply source (e.g., a source for fluid fuel such as natural gas). Any conventional means of coupling so as to enable fluid communication between the fluid inlet 135 and the fluid supply source may be used without departing from the scope of the present disclosure. The structure and operation of such devices is well known to those of ordinary skill in the art, having the benefit of the present disclosure, and will therefore not be discussed in detail herein.

The fluid inlet 135 may in addition be in fluid communication with a conduit (not shown) running along the trailer frame 105 (e.g., from the proximal end 110 to the distal end 111). Thus, in some embodiments, the conduit may be in fluid communication with the fluid supply source (e.g., by way of the fluid inlet 135). The conduit may be any annulus, pipe, hose, channel, or other substantially closed structure capable of conveying a fluid from the fluid inlet 135 to the distal end 111 of the trailer frame 105. In some embodiments, the conduit may, as in FIGS. 1A and 1B, be disposed beneath the top surface 107 of the trailer frame 105 (and therefore covered by the top surface 107). For example, the trailer frame 105 may include a bottom surface 140 traversing the trailer frame 105 from the proximal end 110 to the distal end 111. The bottom surface 140 may in some embodiments extend outward from the trailer at the proximal end 110 so as to support the fluid inlet 135, as shown in FIGS. 1A and 1B. The bottom surface 140 may be attached, connected, or otherwise joined to the top surface 107 in a manner such that the trailer frame 105 includes an annulus (which may in some embodiments be defined by any one or more of the top surface 107 and the bottom surface 140). For example, as shown in FIGS. 1A and 1B, the bottom surface 140 may be coupled to two side members 141 and 142, such that the bottom surface 140, the two side members 141 and 142, and the top surface 107 define an annulus or channel traversing the trailer frame 105 from the proximal end 110 to the distal end 111. This annulus or channel forms a conduit beneath the top surface 107 and in fluid communication with the fluid inlet 135. In other embodiments, any suitable means of defining one or more conduits within the trailer frame 105 may be used—that is, a conduit could traverse any portion of the trailer frame 105 so long as it enables fluid communication from the fluid inlet 135 to the distal end 111. In yet other embodiments, the conduit may comprise a pipe and/or tube in fluid communication with the fluid inlet 135. In these embodiments, the conduit may be located beneath the top surface 107 and may run along the trailer frame 105 substantially from the proximal end 110 to the distal end 111. Such a pipe and/or tube may, in some embodiments, be mounted to the trailer frame 105 (e.g., by mounting to a rail and/or cross member of the trailer frame, not shown in FIGS. 1A and 1B, or my mounting below a flat surface 125 of the top surface 107). In yet other embodiments, the conduit may be a similarly disposed hose instead of or in addition to a pipe. Although specific examples of fluid conduits are provided herein, the present disclosure is not limited as such. Accordingly, the fluid conduit may be any suitable means capable of conveying a fluid from the fluid inlet to the distal end 111 of the trailer frame 105 while being protected by the top surface 107. For instance, the top surface 107 may protect the conduit from ground traffic passing over the conduit by way of the top surface 107.

The trailer 100 may further include a reel frame 150 shown in FIGS. 1A and 1B. The reel frame 150 may be coupled to the trailer frame (e.g., at the distal end 111 as shown in FIGS. 1A and 1B), and it may include a reel 155 capable of winding and unwinding one or more hoses 160 in fluid communication with the conduit. Unwinding may include rotating a rotatable member of the reel 155 so as to unwind a hose 160 from the rotatable member, thereby enabling the hose 160 to be extended away from the reel 155. In contrast, winding may include rotating the rotatable member in an opposite direction so as to wrap the hose 160 back around the rotatable member, thereby detracting it. The hose or hoses 160 may be in direct or indirect fluid communication with the conduit. That is, for example, a hose 160 may be directly connected or otherwise coupled to the conduit at the distal end of the trailer frame 111, or the conduit may be in fluid communication with the reel 155, and the hose 160 in turn may be connected to the reel 155 at a point enabling fluid communication with the conduit. The reel frame 150 of some embodiments, as shown in FIGS. 1A and 1B, may further include a reel housing 165 at least partially enclosing the reel 155 (e.g., so as to protect the reel 155).

Furthermore, in some embodiments, one or more wheels may be coupled to the reel frame 150 (e.g., mounted such that they are capable of rotating so as to enable transport of the trailer). In certain implementations, one or more axles may be used to couple the wheels to the reel frame 150, each axle comprising one or more wheels rotatably mounted thereto. For example, FIGS. 1A and 1B illustrate a first pair of wheels 170 rotatably coupled on a first axle 171, which in turn is coupled to the reel frame 150, and a second pair of wheels 175 rotatably coupled on a second axle 176, which in turn is coupled to the reel frame 150. In the illustrative embodiment shown in FIGS. 1A and 1B, the second axle 176 is mounted to the reel frame 150 such that the second axle 176 and second pair of wheels 175 are slightly higher relative to a ground surface than the first axle 171 and the first pair of wheels 170, respectively. As described in more detail with reference to FIG. 2, below, this may enable the second pair of wheels 175 to contact the ground surface while the trailer 100 is being towed by a towing vehicle, but to remain suspended a distance above the ground surface when the trailer 100 is detached from the towing vehicle and laid in place for fluid delivery, in accordance with some embodiments of the present disclosure.

In certain embodiments, one or more wheels may be coupled to the trailer frame (not shown in FIGS. 1A and 1B). For example, a wheel or wheels may be mounted below the conduit, and the top surface and wheel(s) may be sized such that the lower edges (e.g., lower edges 118 and 119 as shown in FIGS. 1A and 1B) are only barely suspended off a ground surface while the wheel or wheels are in contact with the ground surface, such that wheeled traffic is capable of driving up and onto the top surface 107 via either of the lower edges 118 and 119. Furthermore, the wheel or wheels may be mounted via a spring assembly or other suspension-type means such that when weight is applied to the top surface 107 (e.g., from a truck or other ground vehicle driving over the top surface 107), the lower edges 118 and 119 are pressed down onto the ground surface and held there. In some embodiments (including but not limited to embodiments including a spring assembly or other suspension-type means), a wheel may be detachably mounted to the proximal end 110 of the trailer frame 105 such that the wheel may be used to maintain the proximal end 110 of the trailer frame above the ground when the trailer 100 is being towed, then the wheel (and, in some embodiments, the spring assembly or other suspension-time means) may be removed and laid aside when the trailer 100 is placed in position. In some embodiments, one or more wheels may be mounted and/or detachably mounted at any point along the trailer 100, so long as they enable towing of the trailer 100 when it is detachably coupled to a towing vehicle, and do not interfere with the ability of the trailer frame 105 to function as a bridging surface (e.g., a ramp) permitting wheeled traffic to pass over the conduit.

Operation of some embodiments of the fluid delivery apparatus, including some methods of using the apparatus, may be illustrated at least in part by reference to FIG. 2 (in addition to reference to FIGS. 1A and 1B). As shown in FIG. 2, the trailer 100 is detached from a towing vehicle and laid upon a ground surface 200. It is laid such that lower edge 118 and lower edge 119 (obscured in FIG. 2 by the trailer frame 105) of the trailer frame 105 are substantially in contact with the ground surface 200, and such that the wheel(s) 170 of the first axle 171 mounted to the reel frame 150 are also in substantial contact with the ground surface 200. The wheel(s) 175 of the second axle coupled to the reel frame 150 may be mounted such that they are suspended a distance 210 above the ground surface 200 while the lower edges 118 and 119 of the trailer frame 107 are substantially in contact with the ground surface 200. As can be seen, the sloped top surface 121 enables ground traffic to pass up and over the conduit (housed in FIG. 2 by the sloped top surfaces 120 and 121, and the flat surface 125, of the top surface 107). The fluid inlet 135 may be detachably coupled to a fluid source (e.g. a source for fluid fuel such as natural gas), and the hose 160 may be unwound using the reel 155 and detachably coupled to a piece of equipment to which the fluid is to be supplied (e.g., a piece of drilling equipment to which natural gas is to be supplied). Fluid may then flow from the fluid source through the fluid inlet 135, the conduit, and the hose 160 to the piece of equipment. When this operation is finished, fluid flow may be shut off (e.g., by a valve at the fluid source and/or on the fluid inlet 135), the hose 160 wound onto the reel 155, and the trailer frame 105 may be detachably coupled to a towing vehicle, at which time the trailer 100 may be towed to a second location. At the second location, the trailer frame 105 may be detached from the towing vehicle and laid such that lower edges 118 and 119 of the trailer frame 107 are substantially in contact with the ground surface 200 of the second location, and the process for supplying fluid to a piece of equipment repeated for a second piece of equipment at the second location. A second fluid may be supplied at the second location, and it may be either substantially the same or a different fluid.

In such usage according to some embodiments, the top surface 107 of the trailer frame 105 essentially doubles as a hose ramp for protecting the fluid conduit while permitting ground traffic to pass over the conduit. The coupling of the reel 155 to the trailer frame 105 permits relatively straightforward positioning of all components necessary for fluid conveyance in a single towing process. In certain implementations, the trailer 100 may be towed to a desired location. The trailer 100 may then be unhitched from the towing vehicle, thereby depositing the trailer 100 and all its components at the desired location. In addition, because the hose or hoses of some embodiments is (are) in fluid communication with the conduit, which in turn is in fluid communication with the fluid inlet 135, only two couplings may be necessary to establish fluid communication from a fluid source to a piece of equipment to be supplied with the fluid. A first coupling would fluidically couple the fluid inlet 135 to the fluid source and a second coupling would fluidically couple the hose 160 to the piece of equipment.

Thus, methods according to some embodiments may include delivering a first fluid fuel to a first piece of equipment at a first location using a fluid delivery apparatus such as a trailer according to embodiments described above; detachably coupling the trailer frame to a towing vehicle; towing the trailer to a second location; detaching the trailer frame from the towing vehicle; and delivering a second fluid fuel (or the first fluid fuel) to a second piece of equipment at the second location using the trailer.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee. The indefinite articles "a" or "an," as used in the claims, are defined herein to mean one or more than one of the element that it introduces.

What is claimed is:

1. A fluid delivery apparatus comprising:
   a trailer frame having (i) a proximal end, (ii) a distal end, and (iii) a top surface shaped so as to form a bridging surface, the trailer frame comprising:
     a fluid inlet disposed at the proximal end of the trailer frame; and
     a conduit in fluid communication with the fluid inlet, wherein the conduit fluidically couples the fluid inlet to the distal end of the trailer frame;
     wherein the trailer frame is detachably couplable to a towing vehicle at the proximal end of the trailer frame, the towing vehicle being capable of towing the fluid delivery apparatus, and
     wherein the bridging surface permits passage of wheeled traffic over the conduit when the trailer frame is detached from the towing vehicle;
   a reel frame attached to the trailer frame and comprising a reel capable of winding and unwinding one or more hoses, wherein the one or more hoses are in fluid communication with the conduit; and
   one or more wheels coupled to the reel frame.

2. The fluid delivery apparatus of claim 1, wherein the bridging surface comprises a pair of sloped surfaces, each sloped surface comprising a lower end and an upper end, wherein the pair of sloped surfaces form an up-ramp and down-ramp permitting passage of wheeled traffic over the conduit when the trailer frame is detached from the towing vehicle.

3. The fluid delivery apparatus of claim 2, wherein at least one of the sloped surfaces is foldably coupled to a flat surface of the bridging surface.

4. The fluid delivery apparatus of claim 1,
   wherein the trailer frame further comprises a bottom surface traversing the trailer frame from the proximal end to the distal end,
   wherein two side members couple the bottom surface to the top surface, and
   wherein the bottom surface, the top surface, and the side members form the conduit.

5. The fluid delivery apparatus of claim 1, wherein the conduit is a pipe traversing the trailer frame from the proximal end to the distal end.

6. The fluid delivery apparatus of claim 1, wherein the fluid is natural gas.

7. The fluid delivery apparatus of claim 1, wherein the fluid inlet is detachably couplable to a natural gas source such that the conduit is in fluid communication with the natural gas source.

8. The fluid delivery apparatus of claim 1, wherein the top surface comprises a pair of lower edges and is shaped such that the lower edges are each in substantial contact with a ground surface when the trailer frame is detached from the towing vehicle, and wherein the lower edges are not in contact with the ground surface when the trailer frame is coupled to the towing vehicle.

9. The fluid delivery apparatus of claim 1, further comprising one or more axles coupled to the reel frame, wherein each axle comprises one or more wheels rotatably mounted thereon.

10. The fluid delivery apparatus of claim 9, wherein two axles are coupled to the reel frame.

11. The fluid delivery apparatus of claim 10, wherein each of the two axles comprises two wheels rotatably mounted thereon.

12. The fluid delivery apparatus of claim 9, wherein a first axle is mounted closer to the ground surface relative to a second axle, such that
each of the one or more wheels mounted on the first axle are in contact with the ground surface when the trailer frame is detached from the towing vehicle and when the trailer frame is coupled to the towing vehicle, and
each of the one or more wheels mounted on the second axle are not in contact with the ground surface when the trailer frame is detached from the towing vehicle, and are in contact with the ground surface when the trailer frame is coupled to the towing vehicle.

13. A method of delivering fluid fuel to a component comprising:
delivering a first fluid fuel to a first piece of equipment at a first location using a trailer comprising:
a trailer frame having a top surface, wherein the trailer frame comprises a fluid conduit and the top surface comprises a pair of sloped surfaces defining an up-ramp and down-ramp permitting passage of wheeled traffic over the fluid conduit, and
a reel capable of winding and unwinding one or more hoses in fluid communication with the conduit;
detachably coupling the trailer frame to a towing vehicle;
towing the trailer to a second location;
detaching the trailer frame from the towing vehicle; and
delivering a second fluid fuel to a second piece of equipment at the second location using the trailer.

14. The method of claim 13, wherein at least one of the first fluid fuel and the second fluid fuel comprises natural gas.

15. The method of claim 13, wherein delivering the first fluid fuel to the first piece of equipment at the first location comprises:
detachably coupling at least one of the one or more hoses to the first piece of equipment;
detachably coupling a fluid inlet mounted on the trailer frame and in fluid communication with the fluid conduit to a first fuel source such that the first fluid fuel flows from the first fuel source to the first piece of equipment via the conduit and the at least one of the one or more hoses.

16. The method of claim 13, further comprising detachably coupling the trailer frame to the towing vehicle via a hitch.

17. The method of claim 16, wherein the hitch comprises at least one of a wheel and a king pin.

18. The method of claim 13, further comprising towing the trailer to the second location behind the towing vehicle.

* * * * *